United States Patent Office 3,347,219
Patented Oct. 17, 1967

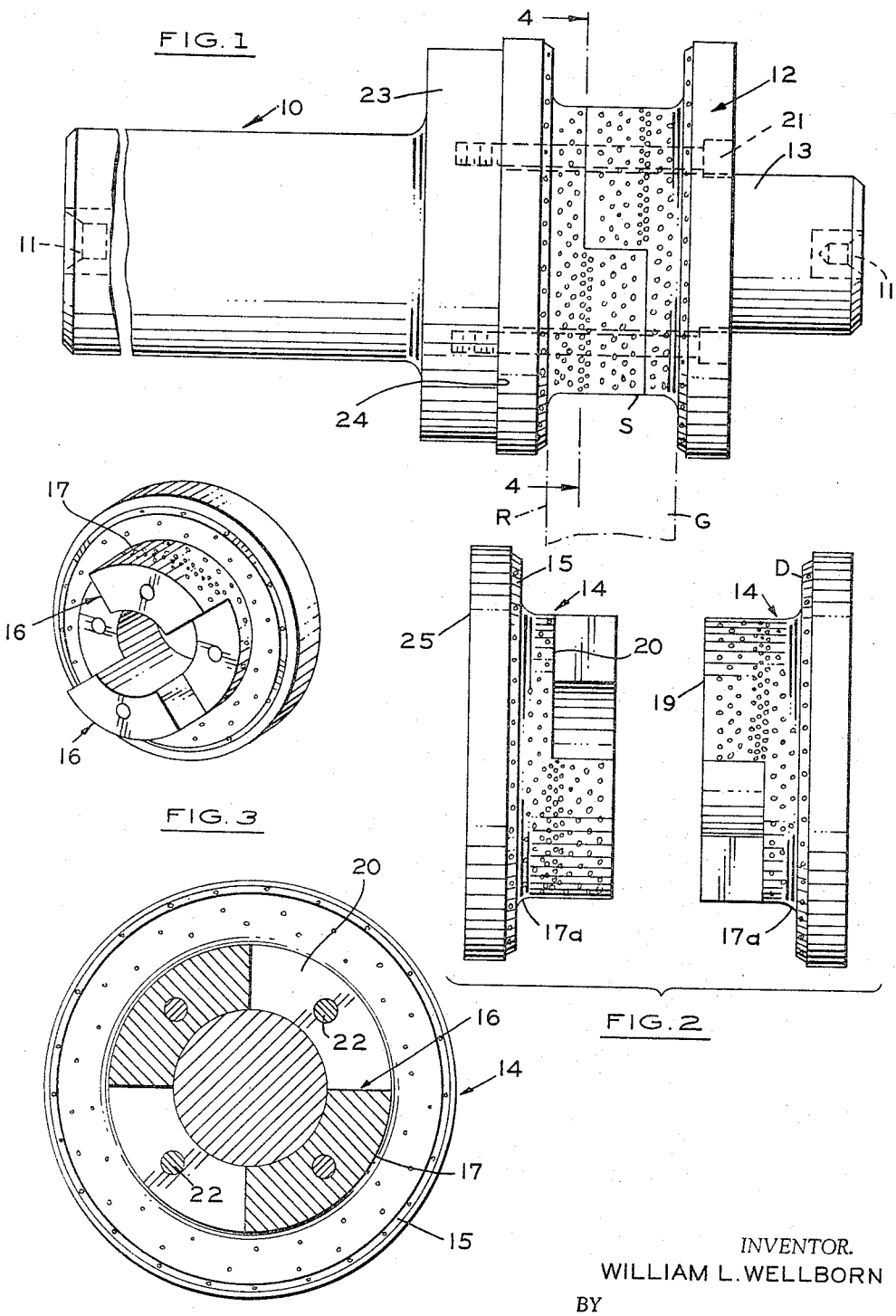

3,347,219
DIAMOND DRESSING TOOL
William W. Wellborn, Milford, Mich., assignor to Abrasive Dressing Tool Company, Detroit, Mich., a corporation of Michigan
Filed Sept. 30, 1964, Ser. No. 400,367
2 Claims. (Cl. 125—11)

ABSTRACT OF THE DISCLOSURE

The diamond dressing tool disclosed herein comprises an arbor having opposed centers at opposite ends thereof and a rotary dressing tool comprising a pair of telescoping members mounted on the arbor with one of the members engaging a radially extending shoulder on the arbor. Each telescoping member has an annular radially extending dressing surface and a plurality of circumferentially spaced arcuate segments and intervening complementary spaces with the segments of one member telescoping into the spaces of the other member. Each segment has an arcuate peripheral surface merging with the radial dressing surface so that when the members are telescoped together, a substantially continuous dressing surface is provided. The dressing surfaces have diamonds embedded therein. Each segment has a flat radially extending seating surface on the end thereof which engages a complementary seating surface on the other member.

---

This invention relates to diamond dressing tools for dressing grinding wheels and particularly to rotary diamond dressing tools.

In the dressing of grinding wheels by diamond dressing tools, it is conventional to utilize a dressing tool having a width substantially equal to the thickness of the diamond dressing tool. If the diamond dressing tool has a greater width then it will wear unevenly and will require relapping more frequently.

It is therefore an object of this invention to provide a diamond dressing tool which can be adjusted in width to accommodate grinding wheels of different thicknesses.

In the making of a crankshaft or the like, it is conventional to grind the bearing surface with an annular axially extending cylindrical portion, radial portions extending outwardly from the extremities of the cylindrical portion and portions of predetermined radius between the axial and radial surfaces. In the granding of surfaces, a common expedient is to use a grinding wheel having the periphery and the radial surfaces thereof dressed to the desired dimensions.

It is another object of this invention to provide a rotary diamond dressing tool for dressing such a grinding wheel simultaneously along the peripheral, radial and curved connecting surfaces thereof.

It is a further object of the invention to provide such a diamond dressing tool which can be refinished readily upon wear of the dressing tool so that the dressing tool will be returned to the desired dimensional tolerances.

In the drawings:

FIG. 1 is a fragmentary side elevational view of a rotary diamond dressing tool embodying the invention.

FIG. 2 is an exploded view of the dressing tool per se.

FIG. 3 is a perspective view of one of the members forming the diamond dressing tool.

FIG. 4 is a sectional view taken along the line 4—4 in FIG. 1.

Referring to FIG. 1, an arbor 10 is provided that has hardened centers 11 at opposite ends thereof, for example, carbide centers, so that the arbor 10 can be mounted on a grinding machine. A diamond dressing tool 12 is mounted on a reduced portion 13 of the arbor 10 by telescoping thereover and is held in position, as presently described.

The diamond dressing tool 12 comprises a pair of complementary members 14 which are preferably of identical construction. Each member 14 comprises a body of suitable material such as a tungsten-nickel-copper alloy and has an annular radially extending dressing surface 15 at right angles to the axis of the body which is adapted to dress the radial side surface R (FIG. 1) of the dressing wheel.

Each body 14 also includes a plurality of arcuate segments 16. Each segment 16 has an annular part cylindrical dressing surface 17. The angular extent of each segment 16 is such that when the segments are brought into telescoping relation as shown in FIG. 1, the arcuate dressing surfaces 17 define a complete cylindrical surface which is adapted to dress the periphery S (FIG. 1) of the grinding wheel V.

Surfaces 15, 17 are connected by annular curved surfaces 17a. Each of the surfaces 15, 17 and 17a has a plurality of diamonds D embedded therein.

As further shown in FIGS. 1–4, each segment 16 has axially extending radial surfaces 18 at the ends thereof which engage and abut the surfaces 18 of the adjacent segments 16, each segment 16 includes at its end a flat surface 19 that lies in a radial plane at right angles to the axis of the body 14. Surface 19 is adapted to abut a complementary surface 20 on the opposite body.

When the complementary members 14 are telescoped together, as shown in FIG. 1, they are, in turn, telescoped over the reduced portion 13 of arbor 10. Bolts 21 extend through openings 22 and are threaded into a shoulder 23 on the arbor 10 to hold the diamond tool in position on the arbor. The abutting surface 24 of shoulder 23 is accurately machined at right angles to the axis of the arbor 10 and the outer surface 25 of the tool member 14 is also correspondingly accurately formed.

Each of the members 14 of the diamond tool 12 is preferably identical in construction and can be made by conventional molding methods such as a sintering process in a mold. The diamonds are preferably uniformly distributed over the surfaces 15, 17 and 17a except for a narrow annular area adjacent each of the abutting surfaces 19, 20. Moreover, in the area A circumferentially adjacent the abutting surfaces 19, 20, the diamonds are provided in more closely spaced relation so that the density of distribution of the diamonds throughout the width of the surfaces 17 is substantially the same circumferentially.

In practice, when the diamond tool 12 is mounted on the arbor 10, the arbor is placed between the centers of a grinding machine which normally holds a workpiece such as a crankshaft between the centers. The grinding wheel is then moved into grinding position and the surfaces of the grinding wheel are dressed by engagement with the surfaces 15, 17 and 17a of the diamond tool. The width of the surfaces 17 can be changed to accommodate various widths of grinding wheels by moving the members 14 away from one another and by the use of shims between the surfaces 19, 20.

After repeated dressings of the grinding wheel, the surfaces of the diamond tool will be worn so that the dimensional accuracies will be lost. In the present diamond tool embodying the invention, the tool can be readily refinished by relapping the surfaces 15, 17 and 17a on a cylindrical grinder or the like. The axial dimensional change between the surfaces 15 as a result of the wear can be compensated for by machining off a portion of the surfaces 19, 20 so that when the members 14 are brought into telescoping relation, the desired axial dimension between the surfaces 15 will be re-established.

It can thus be seen that there has been provided a diamond dressing tool which can be adjusted to dress grinding wheels of different widths; which will simultaneously dress the axial and radial peripheral surfaces of a grinding wheel; which can be made at low cost; and which can be readily re-finished to compensate for wear in the dressing tool due to repeated use.

Although the invention has been described in connection with the dressing of generally flat, axial and radial surfaces of a grinding wheel connected by curved surfaces, the invention is also applicable to the dressing of grinding wheels to produce any desired contour that includes both axial and radially extending surfaces. The terms "axial and radial surfaces" as used herein are intended to include contours which consists entirely of cruved as well as straight surfaces.

I claim:

1. The combination comprising
   an arbor having opposed centers at opposite ends thereof,
   and a rotary dressing tool mounted on said arbor and comprising a pair of telescoping members,
   said arbor having an integral radially extending shoulder,
   one of said dressing tool members abutting said shoulder,
   said dressing tool members having openings extending axially therethrough whereby said members may be positioned on said arbor,
   and means extending through the other of said dressing tool members to said first-mentioned dressing tool member into said shoulder to hold said dressing tool in proper relation on said arbor,
   each member comprising a body having an annular radially extending dressing surface extending generally transversely to the axis of the arbor,
   and a plurality of circumferentially spaced arcuate segments and intervening complementary spaces,
   said segments of each member telescoping into the intervening spaces of the other member,
   each said segment having an arcuate peripheral dressing surface merging with said radial dressing surface of its respective member whereby when said members are telescoped together, said arcuate peripheral surfaces of said telescoping members are positioned adjacent one another so that a substantially continuous dressing surface is provided by said radial surfaces and said arcuate peripheral surfaces,
   each of said dressing surfaces having diamonds embedded therein,
   each said member having a substantially flat radially extending seating surface on the end of each segment and a complementary seating surface in aligned relation with the seating surface of the segments on the other member,
   said seating surfaces engaging when said members are in telescoping relation,
   said segments having adjacent side surfaces which are in contact when said members are in telescoping relation,
   whereby upon wear of the arcuate peripheral surfaces and the radial dressing surfaces, said seating surfaces on the ends of the segments can be re-finished to bring the radial dressing surfaces into proper dimensional relation to one another.

2. The combination set forth in claim 1 wherein said side surfaces extend axially and are at a right angle to the seating surfaces.

References Cited

UNITED STATES PATENTS

| | | | |
|---|---|---|---|
| 2,594,137 | 4/1952 | Doermann | 51—207 |
| 2,712,205 | 7/1955 | Valette | 51—207 X |
| 2,770,925 | 11/1956 | Wallace | 125—11 X |
| 2,926,651 | 3/1960 | Balsiger | 125—11 |
| 2,975,782 | 3/1961 | Balsiger | 125—11 |
| 3,078,835 | 2/1963 | Thomas | 125—11 |
| 3,157,174 | 11/1964 | Emery | 125—39 X |

FOREIGN PATENTS 43,384   8/1910   Austria.

HAROLD D. WHITEHEAD, *Primary Examiner.*